H. L. MEDLEY.
ARTIFICIAL BAIT.
APPLICATION FILED FEB. 18, 1919.

1,341,618.

Patented May 25, 1920.

Inventor:
Harry L. Medley, by Martell & Co.
Attorneys.

UNITED STATES PATENT OFFICE.

HARRY L. MEDLEY, OF LOS ANGELES, CALIFORNIA.

ARTIFICIAL BAIT.

1,341,618.  Specification of Letters Patent.  Patented May 25, 1920.

Application filed February 18, 1919. Serial No. 277,867.

*To all whom it may concern:*

Be it known that I, HARRY L. MEDLEY, a citizen of the United States, residing at Los Angeles, in the county of Los Angeles, State of California, have invented certain new and useful Improvements in Artificial Bait, of which the following is a specification.

My invention relates to what is known as wiggle bait used in deep sea fishing, of the character described in my copending application Serial No. 277,866, filed Feb. 18, 1919, and the object thereof is to provide a cheap, simple and efficient device for that purpose.

In the drawings accompanying and forming a part hereof—

Figure 1:
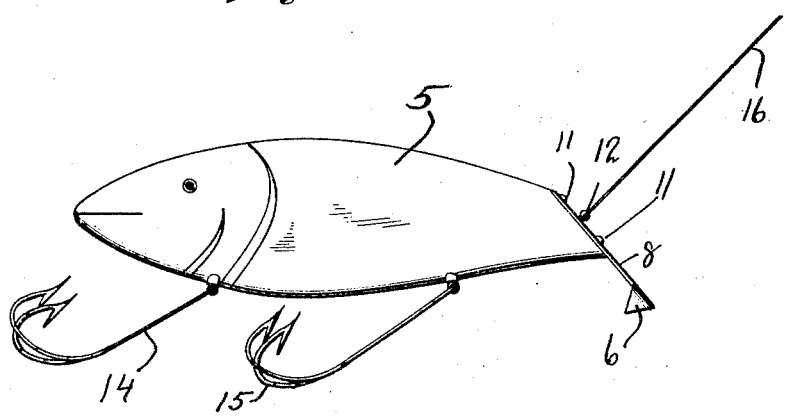
Figure 1 is a side elevation of my improved bait.
Figure 3:
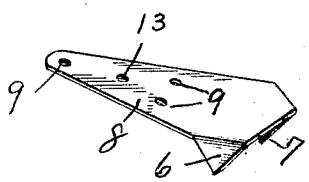
Fig. 3 is a perspective view of my tail piece ready for use.
Figure 2:
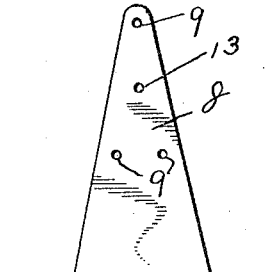
Fig. 2 is a top plan of my tail piece before being bent.

Referring to the drawings 5 represents the body of my bait which is shaped to represent the body of a small fish such as is the natural prey of the fish it is desired to catch, the rear end of which is cut at an angle to extend rearwardly and downwardly.

Secured to this angularly extending end is my tail piece to lie in a plane parallel therewith. This tail piece is preferably formed of metal and is in shape, in top plan, an isosceles triangle having its two base corners 6 and 7 bent to extend at a right angle downwardly from the body portion 8, which corners are caused by the flow of the current to impart a wiggle or life like motion to the body of the bait. Extending through the body portion 8 near its apex are apertures 9 and through these nails 11 or the like are driven into the body member for securing the tail piece thereto. A screw eye 12 is passed through aperture 13 in said tail piece and is secured by means of its threads in the body member 5. Hooks 14 and 15 are secured to the underside of body member 5 in the usual manner.

A fish line 16 has its end secured to screw eye 12.

In the use of my bait the same is first secured to the fish line by means of screw eye 12. It is then placed in the water and as the current flows past the water will impinge upon tail piece 8 and cause the bait to act in a life like manner.

Having described my invention, what I claim is:

1. In an artificial bait the combination with a fish like body having a downwardly and rearwardly beveled rear end, of a triangular guiding plate having its narrower end secured to the beveled end of the body member to lie in a plane parallel therewith and having the corners of its free end bent to extend downwardly at a right angle.

2. In an artificial bait the combination with a fish like body having a downwardly and rearwardly beveled rear end, and fish hooks on the underside thereof, of a triangular shaped guiding plate having its narrower end secured upon said beveled rear end to extend downwardly in a plane parallel therewith, the free corners of said guiding plate being bent downwardly at a right angle to said plate; and line attaching means secured to said rear end.

In testimony whereof I affix my signature hereto in the presence of two witnesses.

HARRY L. MEDLEY.

Witnesses:
 IRA H. McMILLAN,
 L. H. LIVERMORE.